Jan. 21, 1969

K. H. CARPENTER 3,423,026

WINDSHIELD CLEANING DEVICE UTILIZING AN
OSCILLATORY FLUID STREAM

Filed Oct. 30, 1967

INVENTOR.
Keith H. Carpenter
BY
W.A. Schuetz
ATTORNEY

Jan. 21, 1969 K. H. CARPENTER 3,423,026
WINDSHIELD CLEANING DEVICE UTILIZING AN
OSCILLATORY FLUID STREAM
Filed Oct. 30, 1967 Sheet 2 of 2

INVENTOR.
Keith H. Carpenter
BY
W. A. Schuetz
ATTORNEY

United States Patent Office 3,423,026
Patented Jan. 21, 1969

3,423,026
WINDSHIELD CLEANING DEVICE UTILIZING AN OSCILLATORY FLUID STREAM
Keith H. Carpenter, Kettering, Ohio, assignor to General Motors Corporation, Detroit, Mich., a corporation of Delaware
Continuation-in-part of application Ser. No. 513,996, Dec. 15, 1965. This application Oct. 30, 1967, Ser. No. 679,010
U.S. Cl. 239—284  11 Claims
Int. Cl. A47l 1/02; B05b 1/10

ABSTRACT OF THE DISCLOSURE

This disclosure relates to windshield cleaning apparatus having fluid amplifier means for rapidly oscillating an air stream across predetermined areas of the windshield to effect removal of foreign material therefrom and to provide an air curtain between these areas and the adjacent exterior environment to prevent or substantially prevent impingement of foreign material against the windshield.

---

This application is a continuation-in-part of application Ser. No. 513,996, filed Dec. 15, 1965, now abandoned.

The present invention relates to windshield cleaning apparatus or device for an automotive vehicle, and more particularly to a windshield cleaning apparatus which provides a curtain of air across predetermined surface areas of the windshield to effect removal of foreign material therefrom and to prevent impingement of foreign material thereagainst.

It is necessary in the operation of automotive vehicles to provide for removal of foreign material, such as rain drops, dirt, etc., from the windshield in order to provide the operator with an unobstructed view. In accordance with present day practice, windshield wipers in the form of wiper arms and blades which are oscillatable across predetermined areas of the windshield are provided to remove foreign material that becomes attached to the outer surface of the windshield. While such windshield wipers are quite satisfactory in operation, they nevertheless require a relatively large number of parts and do not provide for a completely unobstructed view, since it is necessary to oscillate the wipers across the windshield areas through which the operator is looking.

It is an important object of the present invention to provide a new and improved windshield cleaning apparatus for cleaning the windshield of an automotive vehicle, and which apparatus is of a simple and durable construction, has only a minimum number of parts, and has no moving parts which obstruct the view of the operator.

Another object of the present invention is to provide a new and improved windshield cleaning apparatus which rapidly oscillates a stream of air across predetermined surface areas of a windshield to effect removal of foreign material therefrom and provide a curtain of air between the predetermined surface areas of the windshield and the adjacent exterior environment to prevent or substantially prevent impingement of foreign material against these areas of the windshield.

Yet another object of the present invention is to provide a new and improved windshield cleaning apparatus employing a fluid amplifier means for directing a high velocity stream of air in an oscillatory manner across the windshield to effect removal of foreign material from the windshield and to prevent or substantially prevent impingement of foreign material against the windshield, and thereby provide the operator with an unobstructed view through the windshield.

A further object of the present invention is to provide a new and improved windshield cleaning apparatus for cleaning a predetermined area of a windshield, and which includes a plurality of fluid amplifier means for cleaning certain portions of the predetermined area, and in which the fluid amplifier means are rapidly, sequentially operated so as to provide a curtain of air between said predetermined area of the windshield and the exterior environment adjacent thereto.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views of the illustrated embodiments, and in which.

The present invention provides novel windshield cleaning apparatuses for cleaning predetermined surface areas of a windshield of an automotive vehicle and in a manner such that no visible moving parts are disposed in the line of sight of the operator of the vehicle. The windshield is cleaned by rapidly oscillating a high velocity stream of air across the predetermined areas to be cleaned to provide an air curtain between these areas of the windshield and the adjacent exterior environment. This oscillating stream of air is effective to remove or substantially remove foreign material from the windshield and to prevent or substantially prevent impingement of foreign material, such as rain drops, dirt, etc., against the windshield.

Although the provisions of the present invention can be used to clean virtually all kinds of windshield surfaces or window panes, they are particularly susceptible for use in cleaning "repellent" type windshield surfaces, i.e., windshields provided with coatings which minimize adherence of foreign material, especially rain drops, thereto. By utilizing the provisions of the present invention in conjunction with a repellent type windshield, foreign material coming into contact with the windshield can be readily blown off and removed therefrom.

Figure 1:
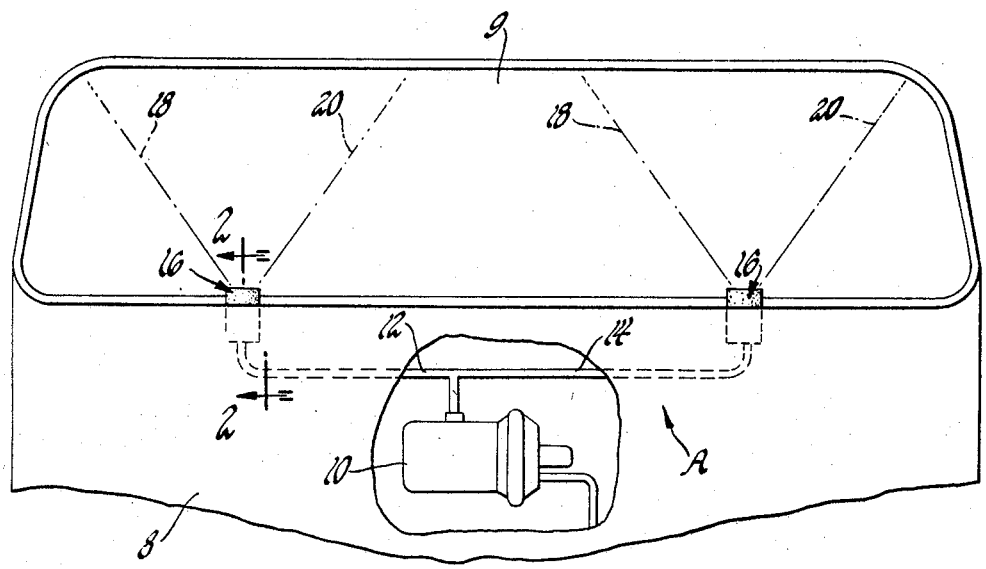
FIGURE 1 is a diagrammatic view of one embodiment of a windshield cleaning apparatus of the present invention and showing the same embodied in automotive vehicle.
Figure 3:
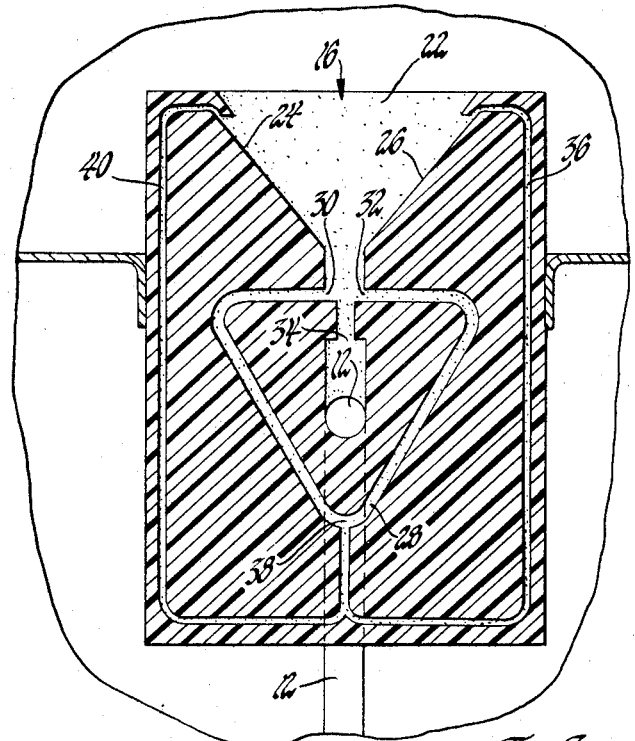
FIGURE 3 is an enlarged fragmentary sectional view taken approximately along line 2—2 of FIGURE 1.

As representing one embodiment of the present invention, FIGURE 1 of the drawings shows a windshield cleaning apparatus A mounted on an automotive vehicle 8 having a rearwardly inclined windshield 9. The windshield cleaning apparatus A includes an air pump 10 which is drivingly connected with the vehicle engine in any suitable or conventional manner and which is operable to supply air under pressure via outlet lines or conduits 12 and 14 to a pair of spaced fluid amplifiers 16. The fluid amplifiers 16 are suitably carried by the cowl structure of the vehicle and are located forwardly of and adjacent the lower edge portion of the windshield 9. Although only two fluid amplifiers are shown in the illustrated embodiment, it will, of course, be understood that a greater number may be employed, if desired.

The fluid amplifiers 16 are each operable to rapidly oscillate the stream of air supplied thereto across the windshield between left and right positions, as indicated by reference lines 18 and 20, to provide a fan or generally V-shaped air curtain between the areas of the windshield defined by the lines 18 and 20 and the exterior environment adjacent thereto. Since both of the fluid amplifiers 16 are of an identical construction, only the leftmost fluid amplifier 16, as viewed in FIGURE 1, will be described in detail.

Figure 2:
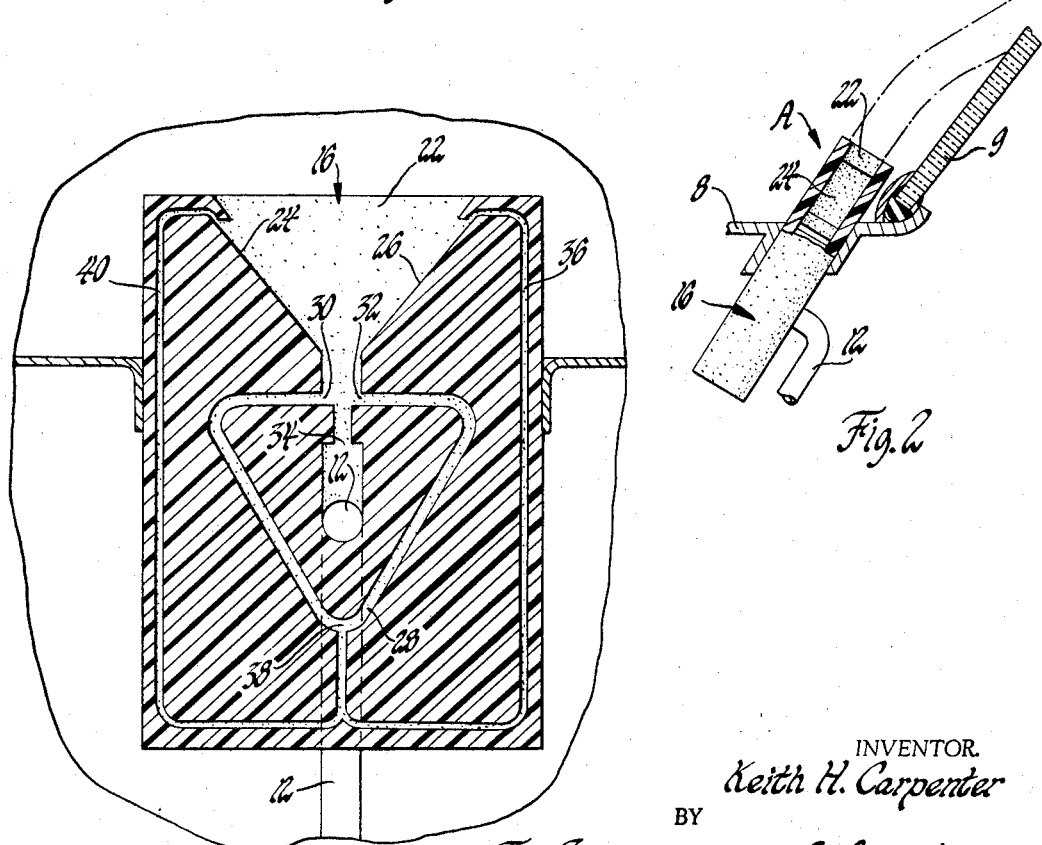
FIGURE 2 is an enlarged fragmentary sectional view of part of the windshield cleaning apparatus shown in FIGURE 1 and taken approximately along line 2—2 of FIGURE 1.

The fluid amplifier 16, as viewed in FIGURE 2, has a fan or V-shaped outlet portion 22 which, in the preferred embodiment, directs the air in directions parallel to the plane of the windshield. The outlet portion 22 has a generally rectangular configuration when viewed in section transversely of the direction of flow of the stream. The fan shaped outlet portion 22 includes a pair of divergent side surfaces 24 and 26 which are in substantial alignment with the reference lines 18 and 20, respectively, and to which the stream of air is adapted to alternately attach. The fluid amplifier 16 further includes a nozzle 34 which is in communication with the conduit 12 and the outlet portion 22 at its inner end. The stream of fluid is emitted from the nozzle 34 at or substantially at sonic velocity and attaches to either the surface 24 or the surface 26 due to the Coanda effect, and in a manner well known to those skilled in the art.

The fluid stream emitting from the nozzle 34 is rapidly oscillated between the surfaces 24 and 26. To this end, the fluid amplifier 16 includes a feedback circuit 28 having a pair of control or outlet ports 30 and 32 interconnected by a passageway. The control ports 30 and 32 are directly opposite each other and located between the inner end of the surfaces 24 and 26 and the outer end of the nozzle 34 near the probable locations to which the stream emitting from the nozzle 34 will attach. A line or passageway 36 having an inlet along surface 26 is provided to feed a pressure pulse to feedback circuit 28 at point 38 when the stream is attached to surface 26. A line or passageway 40 having an inlet along surface 24 is provided to feed a pressure pulse to feedback circuit 28 at the point 38 when the stream is attached to the surface 24. Lines 36 and 40 are sometimes hereinafter referred to as pick-up means.

Operation of the windshield cleaning apparatus A is initiated when the air pump 10 is driven to supply a stream of air under substantial pressure to the amplifiers 16 via conduits 12 and 14. Since both of the amplifiers 16 operate in the same manner, only the operation of the leftmost amplifier 16, as viewed in FIGURE 1, will be described in detail.

The pressurized air supplied to the nozzle 34 is emitted therefrom in a jet stream at sonic or substantially sonic velocity and will attach to either side surface 24 or 26 due to the Coanda effect. When the stream of air attaches to surface 26, the stream of air flowing upwardly across the windshield will be generally along the reference line 20 and a counter-clockwise flow of fluid through feedback circuit 28 results, as viewed in FIGURE 2. At the same time, a small portion of the air stream is bled off via line 36 which results in an input pulse to feedback circuit 28 at point 38. In keeping with well known operating principles of fluid amplifiers, the counter-clockwise flow in circuit 28 is reinforced by this input pulse which results in a positive pressure at control port 32 to cause the air stream emanating from nozzle 34 to be shifted to the surface 24 and extend generally along reference line 18.

In shifting from surface 26 to surface 24, a curtain of air has passed between reference lines 18 and 20, which is the area of potential sweep. When the air stream has shifted to surface 24 and attached thereto, a clockwise flow is set up in feedback circuit 28. Similar to the cycle previously described, air under pressure enters line 40 near surface 24 and is injected into feedback circuit 28 at point 38 which puts a positive pressure at outlet 30 near the area of attachment of the air stream along surface 24. A shifting of the air stream from surface 24 is immediately effected to surface 26 resulting in another sweep in the area defined by reference lines 18 and 20. The rate of oscillation of the air stream between surfaces 24 and 26 is very rapid, i.e., hundreds of cycles per second. It is apparent then that with the structure described, an oscillating air stream in the fan-shaped outlet portion 22 is effected which results in a curtain of air being created in the area of potential sweep on the windshield, i.e., the area defined between the reference lines 18 and 20.

The oscillating air stream, which is preferably directed in directions parallel to the plane of the windshield, also attaches to the windshield as it moves upwardly thereacross, as indicated by reference numeral 42, due to the Coanda effect. This enables the oscillating air stream to effect removal of foreign material on the windshield to clean the same.

The curtain of air set up across the windshield also serves to prevent or substantially prevent impingement of foreign material, such as bugs, dirt, rain drops, etc., against the windshield in the areas defined by reference lines 18 and 20. Foreign material moving toward these areas on the windshield during operation of the vehicle will engage the air curtain and be deflected and/or travel with the air curtain over the top of the vehicle. With the curtain of air caused by the rapidly oscillating stream of air existing across predetermined surface areas of the windshield, no windshield wipers or washers are required in order to keep the windshield clear in the line of vision of the operator. Moreover, a great savings of materials is realized in view of the fact that windshield wipers and washers with the associated drive and power mechanisms become unnecessary. Other advantages, such as a lack of blade, arm, and motor noise and the lack of obstruction of a driver's vision during cleaning, are also realized. Also, the amount of air required to establish the air curtain is relatively small as compared to the amount that would be required to cover the same area in a system in which the air stream is not oscillated. It is understood that the placing of the fluid amplifiers as illustrated in the embodiment shown in FIGURE 1 is illustrative and that many different placements of any number of fluid amplifiers are possible to generate any desired pattern of sweep across the windshield suitable for a given installation.

Figure 4:
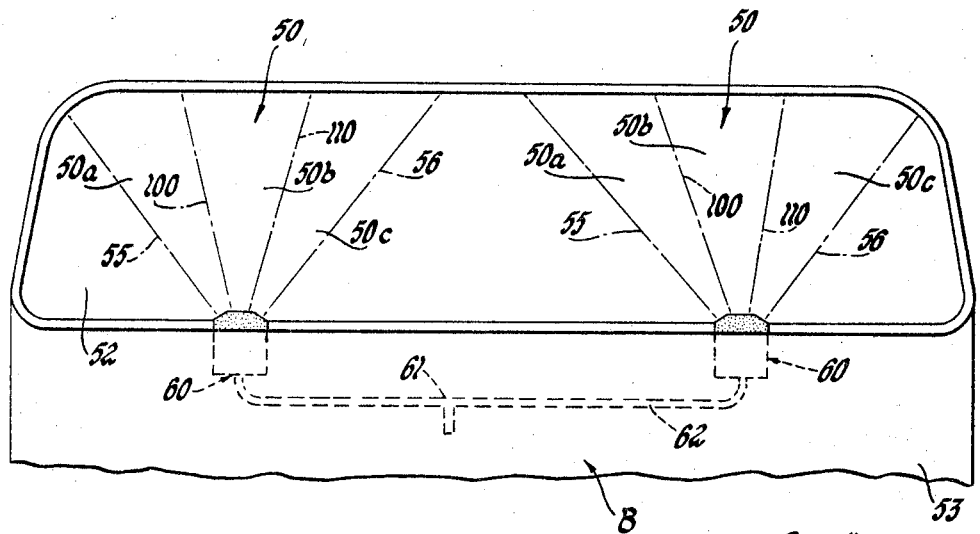
FIGURES 4 and 5 are schematic views showing another embodiment of the windshield cleaning apparatus of the present invention.
Figure 5:
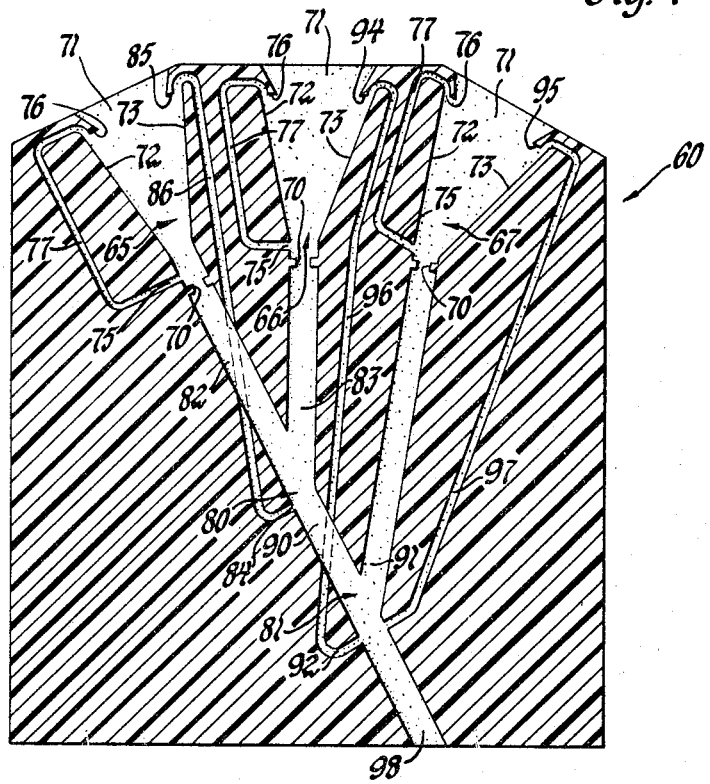

As representing another embodiment of the present invention, FIGURES 4 and 5 schematically show a windshield cleaning apparatus B for cleaning predetermined areas 50 being defined as the areas between reference lines 55 and 56. The windshield cleaning apparatus B includes spaced fluid amplifier means 60 carried by the vehicle cowl structure at locations forwardly of and adjacent the lower edge of the windshield 52. The fluid amplifier means 60 are located adjacent the areas 50 to be cleaned and are adapted to be supplied with a stream of air under pressure from a suitable engine driven pump (not shown) via conduits 61 and 62.

The fluid amplifier means 60 are operable to direct a stream of air upwardly across the areas 50 of the windshield 52 and in directions which are preferably parallel to the plane of the windshield and to conjointly, rapidly sequentially move the stream of air clockwise, as viewed in FIGURE 4, across the windshield between the reference lines 55 and 56 to provide an air curtain between the areas 50 to be cleaned and the exterior environment adjacent thereto. Since both of the amplifier means 60 are of an identical construction, only the leftmost amplifier means 60 and the manner in which it operates will be described in detail.

As schematically shown in FIGURE 5, the amplifier means 60 includes a plurality of fluid amplifiers 65, 66 and 67 located adjacent the lower edge of the windshield and which are adapted to be rapidly, sequentially operated to rapidly move the stream of fluid clockwise across different portions 50a, 50b and 50c of the area 50, as shown in FIGURE 4. Although the fluid amplifiers 65–67 are schematically shown in FIGURE 5 for descriptive purposes as being spaced from each other, it is to be understood that in actual practice they would be disposed relative to each other such that the different portions 50a, 50b and 50c of the area 50 respectively swept by the amplifiers 65, 66 and 67 are contiguous or slightly overlapping.

The fluid amplifiers 65–67 are of a similar construction to the fluid amplifier 16 of the windshield cleaning apparatus A in that they each include an inlet nozzle 70 and a fan or V-shaped outlet portion 71 defined in part by left and right side wall surfaces 72 and 73 which diverge away from each other proceeding from the nozzle 70 toward the outlet end of the outlet portion 71. Each of the fluid amplifiers 65–67 also includes a control port 75 located between the nozzle 70 and the left side wall surface 72 near the point of probable attachment of the fluid stream to the surface 72. The control port 75 is in communication with an inlet 76 at the outer end of the side surface 72 via a line or conduit 77. The control port 75, inlet 76 and line 77 of each of the fluid amplifiers 65–67 constitutes a pick-up means for effecting a switching of the fluid stream from the left side surface 72 to the right side surface 73 thereof and in a manner to be hereinafter more fully described.

The fluid amplifier means 60 also includes a pair of control or switching amplifiers 80 and 81 for switching the fluid stream from amplifier 65 to amplifier 66 and from amplifier 66 to amplifier 67, respectively. Control amplifier 80 has left and right outlet legs 82 and 83 which are respectively in communication with the inlets to amplifiers 65 and 66. The fluid amplifier 80 also includes a transverse control port 84 adjacent the legs 82 and 83 which is in communication with an inlet 85 along the right side wall surface 73 of amplifier 65 via a line or conduit 86 and which is effective to flip or switch the fluid stream from leg 82 to leg 83 when the stream is attached to the right side 73 of fluid amplifier 65. Control amplifier 81 is of similar construction to control amplifier 80 and has left and right legs 90 and 91 which are respectively in communication with the inlet of fluid amplifier 80 and the inlet to fluid amplifier 67. Fluid amplifier 81 also has a pair of transverse control ports 92 and 93 directly opposite each other adjacent the juncture of the legs 90 and 91 and which are in communication with inlets 94 and 95 along the right side wall surfaces 73 of the fluid amplifiers 66 and 67 via conduits 96 and 97, respectively. The inlet 98 of fluid amplifier 81 is in communication with conduit 61.

When the air pump (not shown) for delivering air under substantially pressure via conduit 61 to the inlet 98 of fluid amplifier 81 is driven, the stream of air will flow along the left leg 90 of fluid amplifier 81, since the left leg 90 is more in alignment with the inlet 98 than the right leg 91, as clearly shown in FIGURE 5. The stream of air from the left leg 90 of the fluid amplifier 81 flows through the inlet of fluid amplifier 80 and then flows through the left leg 82 thereof, since the latter is more in alignment with the inlet than the right leg 83. The stream of air from the left leg 82 of fluid amplifier 80 flows into the inlet of fluid amplifier 65 and then issues from the nozzle 70 at sonic or substantially sonic velocity and flows through the outlet portion 71 upwardly across the windshield 52. Since the left side wall 72 is more in alignment with the nozzle 70 than the right side wall 73, the stream of fluid issuing from the nozzle 70 will attach to the left side surface 72 due to the Coanda effect.

As the stream of fluid flows upwardly through the outlet portion 71 along the surface 72 it will flow upwardly across the windshield approximately along reference line 55, which is in alignment with side wall surface 72. At the same time a portion of the flow will flow through inlet 76 via line 77 to the control port 75 to cause a positive pressure to be exerted laterally against the stream which in turn causes the stream to be flipped or shifted to the right side surface 73. During this movement the stream will move across portion 50a of the area 50 from reference line 55 to reference line 100, as shown in FIGURE 4.

When the fluid stream attaches to right side wall 73 of fluid amplifier 65 a portion will flow through inlet 85 via line 86 to inlet port 84 of the fluid amplifier 80. This will cause a positive pressure to be exerted laterally of the stream flowing through the inlet of fluid amplifier 80 which in turn causes the stream flowing therethrough to be shifted from the left leg 82 to the right leg 83. When this occurs, the stream of fluid will have been switched from fluid amplifier 65 to fluid amplifier 66 and will flow through the inlet nozzle 70 thereof and attach to the left side wall surface 72, since the left side wall surface is more closely aligned with the direction the stream is flowing. As the stream flows upwardly along the left side surface 72 of fluid amplifier 66 a portion will flow through inlet 76 via conduit 77 to the control port 75 thereof. This causes a positive pressure to be exerted laterally of the stream, which in turn causes the stream to be flipped or shifted from the left side wall surface 72 to the right side wall surface 73 of the fluid amplifier 66. During this movement the stream of fluid is moved across portion 50b of the area 50 of the windshield from reference line 100 to reference line 110.

When the stream is flowing along the right side surface 73 of fluid amplifier 66 a portion will flow through inlet 94 via line 95 to control port 92. This causes a positive pressure to be exerted laterally of the stream flowing through the inlet 98 of fluid amplifier 81, which in turn causes the stream of fluid to be shifted from the left leg 90 to the right leg 91. This causes the stream of fluid to be switched from fluid amplifier 66 to fluid amplifier 67.

The stream of fluid issuing from nozzle 70 of fluid amplifier 67 will attach to the left side wall surface 72 thereof, since it is more closely aligned with the direction the stream is moving. A portion of the stream of fluid flowing along the left side wall surface 72 of fluid amplifier 67 flows through inlet 76 via conduit 77 to control port 75. This causes a positive pressure to be exerted laterally of the stream of fluid, which in turn causes the stream of fluid to be shifted from the left side wall surface 72 to the right side wall surface 73. During the movement of the fluid from the left side wall surface 72 to the right side wall surface 73 of fluid amplifier 67, the stream moves across portion 50c of the area 50 from reference line 110 to reference line 56.

When the stream is flowing along the right side wall surface 73 of fluid amplifier 67 a portion flows through inlet 95 via conduit 96 to control port 93 of fluid amplifier 81. This causes a positive pressure to be exerted laterally of the stream flowing through the inlet 98 of fluid amplifier 81, which in turn causes the fluid stream to be flipped or shifted from the right leg 91 to the left leg 90. When the fluid stream is again flowing through the left leg 90 of fluid amplifier 81 the afore described cycle of operation will be repeated.

From the foregoing, it can be seen that the fluid amplifier means 60 sequentially moves the stream of fluid clockwise, as viewed in FIGURE 4, across the area 50 of the windshield. The cycle of operation is very rapid, i.e., hundreds of cycles per second. This rapidly moving stream of fluid effects the removal of foreign material from the windshield as well as provide an air curtain to prevent or substantially prevent impingement of foreign material against the windshield. An advantage of the fluid amplifier means 60 is that by employing a plurality of amplifiers with each moving the fluid stream in one direction across only a portion of a designated sweep area that all portions of the area are swept for the same time interval so that a uniform or substantially uniform air barrier or curtain is provided between the area 50 and the exterior environment. If the stream were oscillated by a single fluid amplifier having the same range of sweep, the center portion of this range would not be swept for the same time interval as the end portions of the range.

Although the illustrated embodiments of the present invention have been described in great detail, it should be apparent that certain modifications, changes, and adaptations may be made therein without departing from the spirit of the present invention.

Having described my invention I claim:

1. An apparatus for effecting removal of foreign material from a surface and for preventing impingement of foreign material against the surface comprising: first means for providing a stream of fluid under pressure; and fluid amplifier means for oscillating the stream of fluid provided by said first means across a predetermined surface area of said surface to effect removal of and prevent attachment thereto of foreign material.

2. An apparatus according to claim 1 wherein said fluid amplifier means has a fan-shaped outlet portion.

3. An apparatus according to claim 2 wherein said outlet portion directs said stream of fluid in a direction substantially parallel to the plane of said surface area.

4. An apparatus according to claim 3 wherein said fluid is air and said fluid amplifier means includes a feedback circuit for alternately shifting the stream of air across said predetermined surface area to provide an air curtain thereacross.

5. A vehicle windshield cleaning system comprising: a fluid pressure source; outlets from said fluid pressure source spaced a predetermined distance apart in juxtaposition to a vehicle windshield; and fluid amplifier means having a fan-shaped output area carried in said outlets and responsive to a fluid stream flowing at one extreme of a potential sweep area to act on the stream to shift the fluid stream to another extreme of the potential sweep thereby maintaining a fluid curtain between the two extremes of potential sweep by constant oscillation.

6. The vehicle windshield cleaning system according to claim 5 wherein said fluid amplifier means includes a feedback circuit responsive to an input of air at one extreme of potential fluid sweep to shift the stream of air to the opposite extreme of potential sweep.

7. The vehicle windshield cleaning system according to claim 6 wherein said fluid amplifier means includes a fan-shaped outlet having two surfaces defining the extremes of potential sweep across a windshield; a feedback circuit arranged to produce a flow of air near the attachment points of the fluid on said surfaces of the fan-shaped outlet; and pick-up means at extremities of the surfaces of the fan-shaped outlet to route air flow to said feedback circuit thereby affecting the attachment point pressure to shift the air flow to the other surface defining the opposite extreme of potential sweep across the windshield, the shifting of the air stream from one extremity of potential sweep to the other creating a protective curtain of air across the potential sweep area on the windshield.

8. A windshield cleaning apparatus for cleaning a predetermined area of a windshield of a vehicle comprising: first means for providing a stream of fluid under pressure; and fluid amplifier means for directing said stream of fluid across the predetermined area of the windshield and for conjointly, rapidly moving said stream of fluid laterally of the windshield between first and second position while it is being directed thereacross to effect removal of foreign material from said predetermined area of said windshield and to provide an air curtain to substantially prevent impingement of foreign material against said predetermined area of said windshield.

9. A windshield cleaning apparatus for cleaning a predetermined area of a windshield of a vehicle comprising: first means for providing a stream of fluid under pressure; fluid amplifier means in communication with said first means for rapidly sequentially moving said stream of fluid across said predetermined area of said windshield to effect removal of foreign material therefrom and to provide an air curtain to substantially prevent impingement of foreign material thereagainst.

10. A windshield cleaning apparatus as defined in claim 9 wherein said fluid amplifier means comprises a plurality of fluid amplifiers with each being operable to move said stream of fluid across a different portion of said predetermined area of said windshield and control means for sequentially communicating said plurality of fluid amplifiers with said first means.

11. A windshield cleaning apparatus as defined in claim 10 wherein said control means includes fluid amplifier means for switching said stream of fluid from one of said plurality of fluid amplifiers to another of said plurality of fluid amplifiers.

References Cited

UNITED STATES PATENTS

| 2,367,426 | 1/1945 | Patterson | 239—284 |
| 3,098,504 | 7/1963 | Joesting | 137—81.5 |
| 3,111,931 | 11/1963 | Bodine | 137—81.5 |

EVERETT W. KIRBY, *Primary Examiner.*

U.S. Cl. X.R.

137—81.5; 239—102, 104, 4, 101